(12) United States Patent
Heitmann et al.

(10) Patent No.: US 6,490,399 B1
(45) Date of Patent: Dec. 3, 2002

(54) GLASS FOR OPTICAL WAVEGUIDES OR THE LIKE

(75) Inventors: Walter Heitmann, Gross-Bieberau (DE); Karl-Friedrich Klein, Friedberg (DE)

(73) Assignee: Deutsche Telekom, Bonn (DE)

( * ) Notice: Subject to any disclaimer, the term of this patent is extended or adjusted under 35 U.S.C. 154(b) by 0 days.

(21) Appl. No.: 09/403,476

(22) PCT Filed: Apr. 11, 1998

(86) PCT No.: PCT/EP98/02119

§ 371 (c)(1),
(2), (4) Date: Jul. 11, 2000

(87) PCT Pub. No.: WO98/47829

PCT Pub. Date: Oct. 29, 1998

(30) Foreign Application Priority Data

Apr. 22, 1997 (DE) .......................................... 197 16 869

(51) Int. Cl.$^7$ ................................................. G02B 6/00
(52) U.S. Cl. ........................................................ 385/141
(58) Field of Search .................................. 385/141–144

(56) References Cited

U.S. PATENT DOCUMENTS

| | | | |
|---|---|---|---|
| 3,779,628 A | | 12/1973 | Kapron et al. |
| 4,188,089 A | * | 2/1980 | Gliemeroth et al. |
| 4,988,163 A | | 1/1991 | Cohen et al. |
| 5,491,767 A | * | 2/1996 | Mcpherson et al. |

FOREIGN PATENT DOCUMENTS

| | | |
|---|---|---|
| EP | 0 068 388 | 1/1983 |
| JP | 60 51625 | 3/1985 |

OTHER PUBLICATIONS

Mütze, ABC Der Optik, Verlag Werner Dausien, Hanau, I.Aufl., 1961, S. 412.*
Kobayashi et al, "Characteristics of Optical Fibers in Infrared Wavelength Region", Review of Electrical Communications Laboratories 26,3–4(1978)453.**

* cited by examiner

Primary Examiner—Hung N. Ngo
(74) Attorney, Agent, or Firm—Kenyon & Kenyon

(57) ABSTRACT

Optical waveguides made of quartz glass with reduced infrared absorption and reduced attenuation coefficients are made of glass material composed of atoms having mass numbers higher than that of the natural isotope distribution. The quartz glass or doped quartz glass is made of silicon atoms, of which most or all have the mass numbers 29 and/or 30, as well as of oxygen atoms, of which most or all are composed of isotopes with the mass numbers 17 and/or 18. Atoms of the $^{76}$Ge isotope are preferably used for doping with germanium atoms having higher mass numbers than in the natural isotope mixture. Glass with atoms of preferably $^{30}$Si and/or $^{18}$O are preferably used for optical waveguides based on quartz glass having attenuation coefficients below 0.15 dB/km. As indicated, such optical waveguides are also suitable for transmitting high-energy, pulsed or continuous laser light in a wavelength range from 2.0 to 3.0 μm. These optical waveguides are also suitable for transmitting holmium laser light at 2.1 μm and Er laser light with a wavelength of 2.79 and 2.94 μm.

14 Claims, 1 Drawing Sheet

GLASS FOR OPTICAL WAVEGUIDES OR THE LIKE

FIELD OF THE INVENTION

The present invention relates to glass for optical waveguides or the like.

RELATED TECHNOLOGY

Optical waveguides are being increasingly used as transmission lines in telecommunications networks. In addition, optical waveguides are finding increasing use in medicine, sensor technology and for the transmission of high optical powers for the machining of materials. For telecommunications, use appears to be made predominantly of single-mode fibers made of silica glass with a core that is approximately 10 $\mu$m in diameter and a cladding with a lower refractive index and a diameter of 125 $\mu$m. Some optical waveguides are made of silica glass and are characterized by high transmission capacity and low attenuation. At the minimum attenuation given a wavelength of 1.57 $\mu$m, values of approx. 0.20 dB/km are obtained. In 1986, the reference by G. Tanaka et al., "Characteristics of Pure Silica Core Single Mode Optical Fiber", Sumitomo Electric Technical Review 26(1987)43, refers to an optimum value of 0.15 dB/km.

The reference Patent Abstracts of Japan: JP-A-60090845, purportedly describes a gas rinsing with helium and deuterium during the vitrification of porous $SiO_2$ (silica glass) and $GeO_2$-doped silica glass is described. The helium reduces the structure defects in the silica glass during this process and thereupon completely passes off. Deuterium is a hydrogen isotope and expels hydrogen atoms from the material, so that OD-groups instead of OH-groups form in the preform. OH-groups, which can be deemed as impurity in concentrations of less than 0.0001% in silica glass, cause absorption bands in the infrared wavelength range. When hydrogen is replaced by deuterium, the absorption bands shift to longer wavelengths. In this manner, ranges which are important, for example, for optical telecommunications and have additional losses due to the OH absorption, are then free from additional absorption. This technology is costly and has not gained acceptance in practice, because meanwhile, the fiber manufacturers reduce the OH concentration in the silica glass to the extent that the OH absorption virtually plays no role any longer.

In addition, in the reference Database, Chemical Abstracts: Accession No. 81:44002, a silica glass doped with $^{29}Si$ is apparently described generally.

The attenuation $\alpha$ of single-mode fibers above a wavelength of 1 $\mu$m is composed of three components. These are the scattering $\alpha_s$, the OH absorption $\alpha_{OH}$ and the infrared absorption $\alpha_{IR}$. The OH absorption is due to the inclusion of a small concentration of OH ions in the silica glass. It is very highly dependent on the wavelength and manifests itself in the spectral attenuation curve by an absorption band at approximately 1.4 $\mu$m. In the wavelength range of importance for optical telecommunications between 1.5 and 1.7 $\mu$m, the attenuation is virtually determined only by the scattering losses and the infrared absorption. The scattering losses are due essentially to Rayleigh scattering and decrease with increasing wavelength $\lambda$ with $1/\lambda^4$. The infrared absorption starts at around 1.5 $\mu$m and rises steeply with increasing wavelength. The minimum attenuation is at 1.57 $\mu$m, because this is where the decrease of the scattering losses and the increase of the infrared absorption are of identical magnitude.

FIG. 1 shows the described situation with reference to the spectral attenuation curve of a single-mode fiber for the wavelength range between 1.1 and 1.7 $\mu$m. The OH absorption band at 1.4 $\mu$m is clearly evident. At its minimum at 1.57 $\mu$m, this fiber has an attenuation of 0.17 dB/km. The characteristic curve of the scattering losses without OH and infrared absorption is shown by the broken line. OH absorption plays virtually no role for the wavelengths above 1.5 $\mu$m. Starting from around 1.6 $\mu$m, there is then a steep rise in infrared absorption. The reference by M. E. Lines et al., "Calcium Aluminate Glasses As Potential Ultralow-Loss Optical Materials At 1.5–1.9 $\mu$m", Journal of Non-Crystalline Solids 107(1989)251, purportedly describes that infrared absorption is calculated according to the formula $\alpha_{IR}=A \cdot e^{-a/\lambda}$. In this context, $A=6 \cdot 10'$ dB/km and $a=48$ $\mu$m is given for silica glass. An infrared absorption of 0.02 dB/km and 0.33 dB/km is calculated therefrom for 1.55 $\mu$m and 1.7 $\mu$m, respectively. The infrared absorption in glasses is caused by the tails of extremely strong vibration bands (phonons) in the long-wave infrared range, as purportedly described by the reference by S. Kobayashi et al., "Characteristics of Optical Fibers in Infrared Wavelength Region", Review of Electrical Communications Laboratories 26,3–4 (1978)453. The dominant absorption band of pure silica glass is at 9.1 $\mu$m and has, at its maximum, an attenuation of $10^{10}$ dB/km. The spectral position and width of the absorption band are determined by the masses of the atoms involved, i.e., in the case of silica glass, by the masses of silicon and oxygen. The basic physical principles of this are purportedly presented in detail in the reference by T. Ruf et. al.: "Von Federn und Massen: Physik isotopenreiner Halbleiter" ("Of Springs and Masses the Physics of Isotropically Pure Semiconductors"), Physikalische Blätter 52,11(1996) 1115. For pure and doped silica glass, which to date has been employed for the manufacture of optical waveguides, use is made of natural isotope mixtures of the elements involved, i.e., silicon and oxygen in the case of pure silica glass. Germanium and fluorine are mainly used as dopants.

SUMMARY OF THE INVENTION

An object of the present invention is to provide glass with reduced infrared absorption, the glass being especially suitable for optical waveguides with significantly reduced, minimal attenuation coefficients and for effective manufacture.

The present invention provides an optical waveguide comprising a glass material including pure or doped silica glass, the pure or doped silica glass including atoms of at least one element, respective atoms of a first element of the at least one element having a mass number distribution more heavily weighted toward higher mass numbers than a natural mass number distribution of isotopes of the first element.

Owing to the fact that glass is made up of atoms with mass numbers higher than the mass numbers of the natural isotope distribution, the increased mass numbers (atomic masses) result in a shift of the absorption bands toward longer wavelengths and in a reduction of the line width. These two effects mean that the start of infrared absorption is shifted toward longer wavelengths, with the result that there is a considerably broader spectrum of application for optical waveguides or the like made from such glasses. The costs of the optical waveguides account for only a small portion of the total costs, especially in the case of elaborately manufactured submarine, or undersea, cables. Owing to the reduced attenuation of the optical waveguides according to the invention, it is thus possible to economize on or entirely dispense with repeaters/amplifiers, the result being that, in many cases, despite increased fiber costs, there are, overall, considerable cost savings with improved transmission quality in the construction of submarine cable links or for trunk cables over land.

BRIEF DESCRIPTION OF THE DRAWING

The present invention may be more easily understood with reference to the drawings, in which.

DETAILED DESCRIPTION

Figure 1:
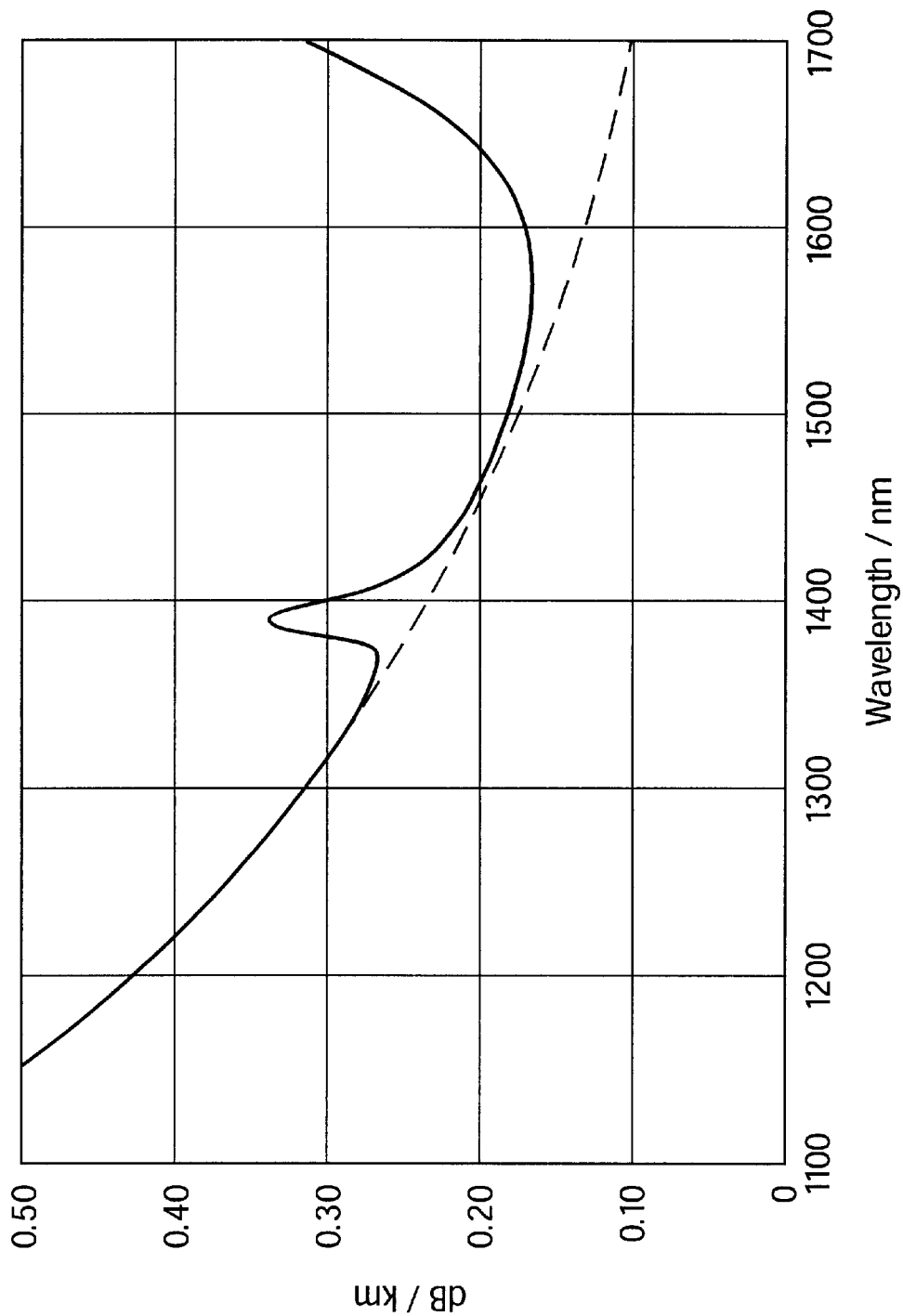
FIG. 1 shows a spectral attenuation curve of a single-mode fiber for the wavelength range between 1.1 and 1.7 µm.

First, a table is shown which compiles the stable isotopes of silicon and oxygen according to information from the Physikalisches Taschenbuch ("Physics Pocketbook"), 5th edition, 1976, Viehweg Verlag Braunschweig, published by H. Ebert.

TABLE

| Oxygen: O Mass number/ frequency % | | Fluorine: F Mass number/ frequency % | | Silicon: Si Mass number/ frequency % | | Germanium: Ge Mass number/ frequency % | |
|---|---|---|---|---|---|---|---|
| 16 | 99.76 | 19 | 100 | 28 | 92.2 | 70 | 20.5 |
| 17 | 0.037 | | | 29 | 4.7 | 72 | 27.4 |
| 18 | 0.204 | | | 30 | 3.1 | 73 | 7.7 |
| | | | | | | 74 | 36.5 |
| | | | | | | 76 | 7.8 |

The silica glasses for optical waveguides produced until now have employed natural isotope mixtures. For pure silica glass, according to the table of an isotope mixture made essentially of $^{28}$Si and $^{16}$O. According to the present invention, the natural isotope mixture or the light isotopes wholly or partially by heavy isotopes, i.e., to make $SiO_2$ from $^{30}$Si and $^{16}$O, or from $^{30}$Si and $^{18}$O, or from $^{28}$Si and $^{18}$O, are replaced. The sum of the increased mass numbers (atomic masses) causes a shift of the absorption bands toward longer wavelengths and a reduction of the line width. These two effects mean that the start of infrared absorption is shifted toward longer wavelengths. According to the reference by T. Ruf et al., "Von Federn und Massen: Physik isotopenreiner Halbleiter", Physikalische Blätter 52,11 (1996)1115, the shift of the spectral position of the absorption bands is proportional to $1/\sqrt{M}$ (M is the mass number) and the width of the absorption band is proportional to $1/M$. If $^{28}$Si is replaced by $^{30}$Si, this results, for the band at 9.1 µm, in a shift to 9.25 µm, which corresponds to a difference of 0.15 µm. The reduction of the width of the absorption band basically has twice the effect on the start of infrared absorption in the shortwave spectral range, thus also in the attenuation minimum, with the consequence that, for an optical waveguide made of $^{30}$Si and $^{16}$O, appreciable infrared absorption starts only at 1.95 µm instead of at 1.5 µm. Therefore, the attenuation minimum is shifted to 1.95 µm. With the hitherto achieved values for scattering losses in silica glass optical waveguides, there is then an attenuation coefficient of less than 0.1 dB/km.

If a silica glass is made from $^{30}$Si $^{18}$O, the start of infrared absorption is shifted by approximately 1.35 µm, i.e., the attenuation minimum is then shifted to 2.85 µm, this resulting in an attenuation coefficient of less than 0.05 dB/km.

Optical waveguides with attenuation coefficients less than 0.1 or 0.05 dB/km open up new possibilities for submarine, or undersea, cables, in particular. Namely, until now, it has been necessary to equip submarine cables with repeaters or optical amplifiers at specified distances, which necessitate remote electrical power feeding for the energy supply, thereby resulting in high costs. Repeater-/amplifier-free cables have been developed for the offshore region, such cables being capable of spanning a maximum of 500 km with a fiber attenuation of 0.2 dB/km. If optical waveguides with less than 0.1 dB/km are made available by the application of the glass according to the invention, it will now be possible for all continents to be linked by such submarine cables without the use of amplifiers or repeaters.

Although high costs are involved in manufacturing glasses from pure isotopes or from isotope mixtures whose distribution differs from the natural distribution, these costs do not play any decisive role in the practical application of the proposed embodiment for the following reasons.

The optical waveguides or their preforms can be produced according to a so-called casing process which is already in practical use today. In this process, only the inner preform, i.e., the core and a region near to the core, is manufactured according to the conventional process. Melted onto this inner preform is a thick-walled tube of pure silica glass (casing tube) whose production costs, based on the identical quantity, are considerably lower than those for the inner preform.

The material constituent of the inner preform can be reduced to approximately 5% of the total volume without there being any increase in attenuation with the fibers manufactured from such preforms. The result of this is that only 5% of the fiber material must be produced from glass of modified isotope composition. For one kilometer of single-mode fiber, this is equivalent to a mass of less than 2 grams.

For elaborately manufactured submarine cables, the costs for the optical waveguides account for only a small portion of the total costs. If, due to lower attenuation of the optical waveguides, it becomes possible to economize on or to dispense entirely with repeaters and amplifiers, despite increased fiber costs, the overall result will be considerably lower costs with improved transmission quality and reduced frequency of repair for applications in long submarine cable links or even for trunk cables over land.

Only minor changes in infrared absorption are to be expected from the replacement of the natural isotope distribution of the dopants by heavier isotopes. There is only one stable isotope in the case of fluorine. The mass number of all germanium isotopes is well above the atomic mass number of silicon and oxygen. Furthermore, in standard single-mode fibers, the type of fiber most frequently used in telecommunications, the core material is doped only with about 5% $GeO_2$. Conversely, in the case of higher doping rates, such as in dispersion-shifted single-mode fibers, it is possible to achieve a small shift of the infrared absorption through the use of $^{76}$Ge in relation to glass which is doped with a natural Ge isotope mixture.

As already mentioned, telecommunications is not the only area of application for silica glass fibers made of heavy isotopes with infrared absorption shifted into the longwave spectral range; further important application areas also exist, for example, in industrial and medical applications with infrared lasers.

Light absorption, for example in tissue or in blood, is particularly high both in the UV range, caused by protein and water absorption, and also in the infrared range, caused by water absorption. The penetration depth for UV laser light and also for the light of a $CO_2$ laser (10.6 µm) and of the Er:YAG (at 2.94 µm) and Er:YSGG (at 2.79 µm) is in the range between 1 and 20 μm. Owing to this short distance in which the absorbed energy is converted into other forms, Er lasers, above all, are of interest as highly efficient and reliable sources of radiation for medical applications. Such medical applications require optical waveguides approximately 2 meters long whose overall transmission should not be considerably below 50%, i.e., the required attenuation is of the order of magnitude of max. 3 dB.

It is also known that, of optical fibers made of a variety of materials, such as chalogenides, halogenides, sapphire, waveguides, fluid light guides, none approaches the qualities of silica glass fibers. However, a major disadvantage of standard silica glass is that the attenuation at Er laser wavelengths is so high that applications have hitherto been limited to very short sections of fiber.

It has now been established that a silica glass fiber at 2.94 μm has an attenuation factor of 12 dB/m, i.e., after 2 meters fiber length, less than 1% of the coupled-in optical power emerges at the end of the fiber. On the other hand, if a silica glass made of $^{30}Si^{16}O_2$ is used, the absorption edge shifts by approximately 0.3 μm in this range, which, with regard to the logarithmically represented attenuation, lies in the middle between the absorption minimum and maximum. The infrared absorption at 2.94 μm is thereby reduced to approximately 1.8 dB/m. It may be that this value is considerably higher than the previously described minimal attenuation factor, however, it is entirely sufficient for the applications in this wavelength range. Approximately 40% of the coupled-in radiant power now still exits at the end of a 2-meter-long glass fiber. This transmission value lies in the aforementioned order of magnitude of about 50%. On the other hand, the other advantageous characteristics of silica glass and silica glass fibers are not changed. This makes it possible to implement new silica glass fiber transmission systems in medical technology at 2.94 μm, this being accomplished in conjunction with cost-effective Er lasers.

Furthermore, owing to the lower absorption, the transmitted power density or power can be considerably increased, and specifically to values which would result in overheating and destruction with the hitherto known fibers. This, therefore, also opens up new areas of application in industry, especially in the machining of materials.

Even for these additional applications, the material usage of (heavy) silicon dioxide ($^{30}Si^{16}O_2$) is low. Although the fibers are considerably thicker, and specifically with typical core diameters of 200 to 600 μm and a typical cladding-core ratio of 1.1 to 1.4, only isotope material in the gram range is required owing to the considerably shorter fiber length of approximately 2 meters. A fiber with a core diameter of 200 μm and a cladding diameter of 240 μm weighs only approximately 0.2 grams.

What is claimed is:

1. An optical waveguide comprising a glass material including pure or doped silica glass, the pure or doped silica glass including atoms of at least one element, respective atoms of a first element of the at least one element having a mass number distribution more heavily weighted toward higher mass numbers than a natural mass number distribution of isotopes of the first element.

2. The optical waveguide as recited in claim 1 wherein the first element is silicon, the respective atoms of the silicon being predominantly or entirely isotopes having respective mass numbers of 29 and/or 30.

3. The optical waveguide as recited in claim 1 wherein the first element is oxygen, the respective atoms of the oxygen being predominantly or entirely isotopes having respective mass numbers of 17 and/or 18.

4. The optical waveguide as recited in claim 1 wherein the first element is silicon and a second element of the at least one element is oxygen, the respective atoms of the silicon being predominantly or entirely isotopes having respective mass numbers of 29 and/or 30, respective atoms of the oxygen being predominantly or entirely isotopes having respective mass numbers of 17 and/or 18.

5. The optical waveguide as recited in claim 1 wherein the material is doped silica glass, the doped silica glass being doped with atoms of isotope $^{76}Ge$.

6. The optical waveguide as recited in claim 1 wherein the at least one element includes at least one of the first element, oxygen and germnanium, the first element being silicon, respective atoms of the oxygen having a mass number distribution more heavily weighted toward higher mass numbers than a natural mass number distribution of oxygen isotopes, respective atoms of the germanium having a mass number distribution more heavily weighted toward higher mass numbers than a natural mass number distribution of germanium isotopes.

7. The optical waveguide as recited in claim 6 wherein the silicon includes $^{30}Si$, the oxygen includes $^{18}O$, and the germanium includes $^{76}Ge$.

8. The optical waveguide as recited in claim 1 wherein the pure or doped silica glass has an attenuation of less than 0.15 dB/km.

9. The optical waveguide as recited in claim 1 wherein the optical waveguide includes a conical profile in a coupling-in region so as to reduce a power density in the coupling-in region.

10. The optical waveguide as recited in claim 1 wherein the optical waveguide is adaptable to transmit at least one of high-energy laser light in a wavelength range from 2.0 to 3.0 μm, pulsed laser light in a wavelength range from 2.0 to 3.0 μm and continuous laser light in a wavelength range from 2.0 to 3.0 μm.

11. The optical waveguide as recited in claim 9 wherein the optical waveguide is adaptable for transmitting an erbium laser light including wavelengths of approximately 2.79 and 2.94 μm.

12. The optical waveguide as recited in claim 1 wherein the optical waveguide is adaptable for use in at least one of undersea cables, undersea trunk lines, short-distance waveguides, medical technology and machining of materials.

13. The optical waveguide as recited in claim 1 wherein the optical waveguide includes doped silica glass, the doped silica glass including a doping having an isotope distribution different from a natural isotope distribution so that the optical waveguide is adaptable for energy transmission using infrared radiation.

14. The optical waveguide as recited in claim 1 wherein the optical waveguide is adaptable for transmitting a holmium laser light including a wavelength of 2.1 μm.

* * * * *